United States Patent
Bayley et al.

(10) Patent No.: US 6,477,162 B1
(45) Date of Patent: Nov. 5, 2002

(54) DYNAMICALLY ADJUSTING INTEGRATION INTERVAL BASED ON A SIGNAL STRENGTH

(75) Inventors: Gwain Bayley, Carlsbad, CA (US); Robbin Hughes, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/540,798

(22) Filed: Mar. 31, 2000

(51) Int. Cl.[7] .................. H04B 7/216; H04B 15/00; H04Q 7/20; H04K 1/00; H04L 27/30
(52) U.S. Cl. .................. 370/342; 455/434; 375/152
(58) Field of Search .................. 370/328, 335, 370/342, 441, 331–333; 455/434; 375/130, 140–142, 149–150, 152

(56) References Cited

U.S. PATENT DOCUMENTS

| | | | | |
|---|---|---|---|---|
| 4,894,842 A | * | 1/1990 | Broekhoven et al. | 375/142 |
| 5,222,100 A | | 6/1993 | Lundquist et al. | 375/150 |
| 5,440,597 A | * | 8/1995 | Chung et al. | 370/342 |
| 5,577,022 A | * | 11/1996 | Padovani et al. | 370/332 |
| 6,205,168 B1 | * | 3/2001 | Somayazulu | 375/149 |
| 6,320,849 B1 | * | 11/2001 | Hughes et al. | 370/310 |

FOREIGN PATENT DOCUMENTS

| | | |
|---|---|---|
| EP | 0654913 | 5/1995 |
| WO | 9948221 | 9/1999 |

* cited by examiner

*Primary Examiner*—Kwang Bin Yao
*Assistant Examiner*—Kevin C. Harper
(74) *Attorney, Agent, or Firm*—Philip R. Wadsworth; Charles D. Brown; Howard H. Seo (57) ABSTRACT

A method and apparatus for improving searching in a remote unit of a slotted mode, wireless, communication system. In a slotted mode communication system, the remote unit is in an "active state" during its assigned slot. While in the active state, a controller in the remote unit passes selected sets of search parameters to a search engine. The integration interval of the searches performed is based on the measured signal strength of another base station. The search engine performs searches using the integration interval. Searching continues as long as the remote unit is in the active state. When the remote unit enters the inactive state, searching ceases.

25 Claims, 8 Drawing Sheets

DYNAMICALLY ADJUSTING INTEGRATION INTERVAL BASED ON A SIGNAL STRENGTH

RELATED APPLICATIONS

The following U.S. Patent Applications filed concurrently herewith, are related to this application and are hereby incorporated by reference in their entirety: REACQUISITION AND HANDOFF IN A SLOTTED MODE COMMUNICATION SYSTEM, U.S. patent application Ser. No. 09/540,801; Qualcomm Reference No. PD990249); FAST ACQUISITION OF A PILOT SIGNAL IN A WIRELESS COMMUNICATION DEVICE, U.S. patent application Ser. No. 09/540,128; Qualcomm Reference No. PD990253); EFFICIENT SEARCHING BY A REMOTE UNIT IN A SLOTTED MODE COMMUNICATION SYSTEM, U.S. application Ser. No. 09/540,800; Qualcomm Reference No. PD990250); DYNAMIC ADJUSTMENT OF SEARCH WINDOW SIZE IN RESPONSE TO SIGNAL STRENGTH, U.S. patent application Ser. No.09/540,922; Qualcomm Reference No. PD990172); and PRIORITIZATION OF SEARCHING BY A REMOTE UNIT IN A WIRELESS COMMUNICATION SYSTEM, U.S. patent application Ser. No. 09/540,802; Qualcomm Reference No. PD990251).

FIELD OF THE INVENTION

The invention relates to wireless communications systems. In particular, the invention relates to dynamic adjustment of an integration interval in a remote unit in a wireless communication system.

BACKGROUND OF THE INVENTION

Figure 1:
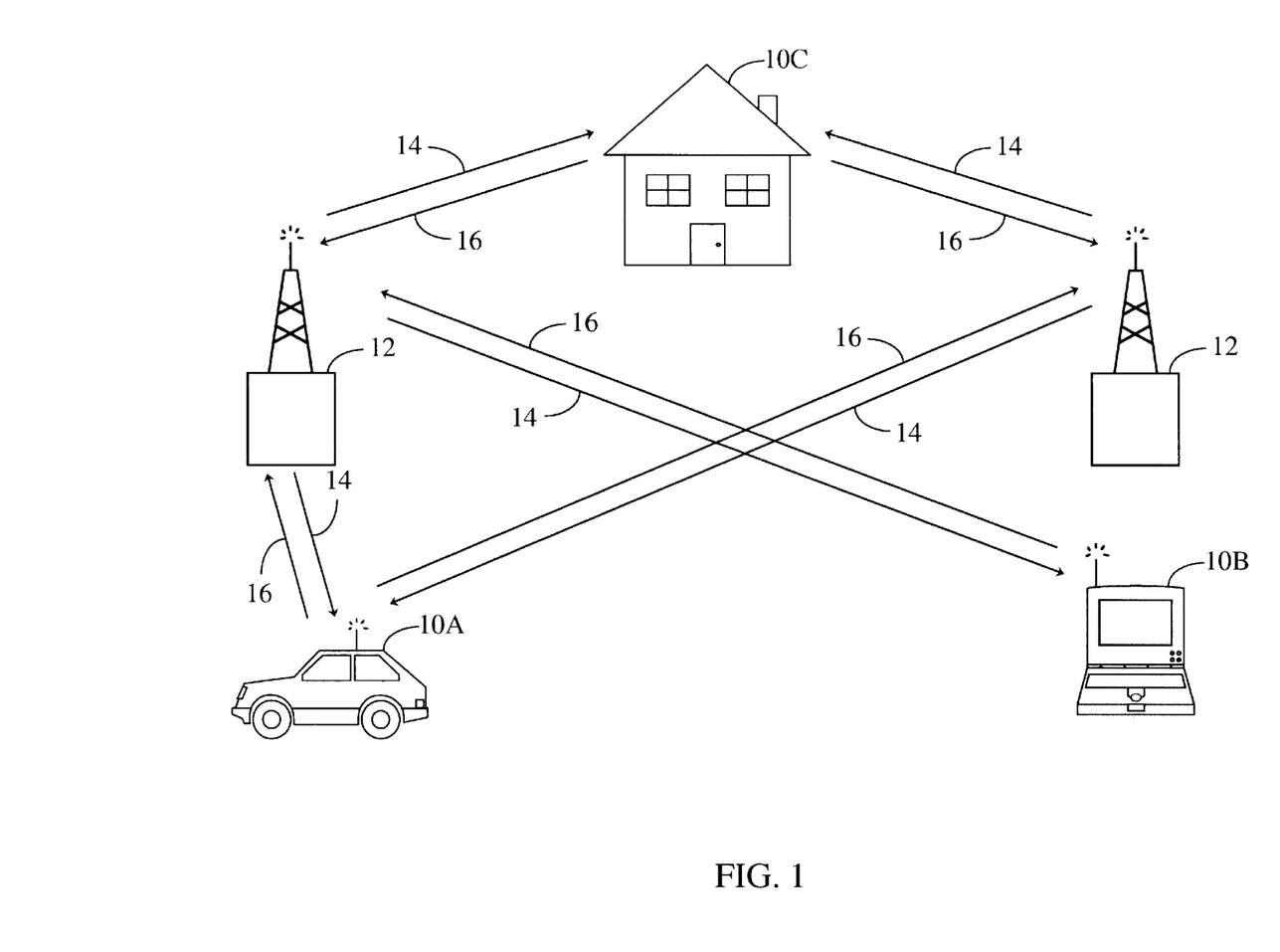
FIG. 1 is a representative diagram showing a typical modern wireless communication system.

A wireless communication system may comprise multiple remote units and multiple base stations. FIG. 1 exemplifies an embodiment of a terrestrial wireless communication system with three remote units 10A, 10B and 10C and two base stations 12. In FIG. 1, the three remote units are shown as a mobile telephone unit installed in a car 10A, a portable computer remote 10B, and a fixed location unit 10C such as might be found in a wireless local loop or meter reading system. Remote units may be any type of communication unit such as, for example, hand-held personal communication system units, portable data units such as a personal data assistant, or fixed location data units such as meter reading equipment. FIG. 1 shows a forward link 14 from the base station 12 to the remote units 10 and a reverse link 16 from the remote units 10 to the base stations 12.

Communication between remote units and base stations, over the wireless channel, can be accomplished using one of a variety of multiple access techniques which facilitate a large number of users in a limited frequency spectrum. These multiple access techniques include time division multiple access (TDMA), frequency division multiple access (FDMA), and code division multiple access (CDMA). An industry standard for CDMA is set forth in the TIA/EIA Interim Standard entitled "Mobile Station—Base Station Compatibility Standard for Dual-Mode Wideband Spread Spectrum Cellular System", TIA/EIA/IS-95, and its progeny (collectively referred to here as IS-95), the contents of which are incorporated by reference herein in their entirety. Additional information concerning a CDMA communication system is disclosed in U.S. Pat. No. 4,901,307, entitled SPREAD SPECTRUM MULTIPLE ACCESS COMMUNICATION SYSTEM USING SATELLITE OR TERRESTRIAL REPEATERS, (the '307 patent) assigned to the assignee of the present invention and incorporated in its entirety herein by reference.

In the '307 patent, a multiple access technique is disclosed where a large number of mobile telephone system users, each having a transceiver, communicate through base stations using CDMA spread spectrum communication signals. The CDMA modulation techniques disclosed in the '307 patent offer many advantages over other modulation techniques used in wireless communication systems such as TDMA and FDMA. For example, CDMA permits the frequency spectrum to be reused multiple times, thereby permitting an increase in system user capacity. Additionally, use of CDMA techniques permits the special problems of the terrestrial channel to be overcome by mitigation of the adverse effects of multipath, e.g. fading, while also exploiting the advantages thereof.

In a wireless communication system, a signal may travel several distinct propagation paths as it propagates between base stations and remote units. The multipath signal generated by the characteristics of the wireless channel presents a challenge to the communication system. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the wireless channel, the multipath is created by reflection of the signal from obstacles in the environment such as, for example, buildings, trees, cars, and people. Accordingly, the wireless channel is generally a time varying multipath channel due to the relative motion of the structures that create the multipath. For example, if an ideal impulse is transmitted over the time varying multipath channel, the received stream of pulses changes in time delay, attenuation, and phase as a function of the time that the ideal impulse is transmitted.

The multipath characteristics of a channel can affect the signal received by the remote unit and result in, among other things, fading of the signal. Fading is the result of the phasing characteristics of the multipath channel. A fade occurs when multipath vectors add destructively, yielding a received signal that is smaller in amplitude than either individual vector. For example if a sine wave is transmitted through a multipath channel having two paths where the first path has an attenuation factor of X dB, a time delay of δ with a phase shift of Θ radians, and the second path has an attenuation factor of X dB, a time delay of δ with a phase shift of Θ+π radians, no signal is received at the output of the channel because the two signals, being equal amplitude and opposite phase, cancel each other. Thus, fading may have a severe negative effect on the performance of a wireless communication system.

A CDMA communication system is optimized for operation in a multipath environment. For example, the forward link and reverse link signals are modulated with a high frequency pseudonoise (PN) sequence. The PN modulation allows the many different multipath instances of the same signal to be separately received through the use of a "rake" receiver design. In a rake receiver, each element within a set of demodulation elements can be assigned to an individual multipath instance of a signal. The demodulated outputs of the demodulation elements are then combined to generate a combined signal. Thus, all of the multipath signal instances must fade together before the combined signal experiences a deep fade.

In a communication system based on the industry standard for CDMA, IS-95, each of the multiple base stations transmits a pilot signal having a common PN sequence. Each base station transmits the pilot signal offset in time from neighboring base stations so that the signals can be distinguished from one another at the remote unit. At any given time, the remote unit may receive a variety of pilot signals from multiple base stations. Using a copy of the PN sequence produced by a local PN generator, the entire PN space can be searched by the remote unit. Using the search results, the controller distinguishes pilot signals from multiple base stations based on the time offset.

In the remote unit, a controller is used to assign demodulation elements to the available multipath signal instances. A search engine is used to provide data to the controller concerning the multipath components of the received signal. The search engine measures the arrival time and amplitude of the multipath components of a pilot signal transmitted by the base stations. The effect of the multipath environment on the pilot signal and the data signal transmitted by a common base station is very similar because the signals travel through the same channel at the same time. Therefore, determining the multipath environment's effect on the pilot signal allows the controller to assign demodulation elements to the data channel multipath signal instances.

The search engine determines the multipath components of the pilot signals of base stations in the proximity of the remote unit by searching through a sequence of potential PN offsets and measuring the energy of the pilot signal received at each of the potential PN offsets. The controller evaluates the energy associated with a potential offset, and, if it exceeds a threshold, assigns a signal demodulation element to that offset. A method and apparatus of demodulation element assignment based on searcher energy levels is disclosed in U.S. Pat. No. 5,490,165 entitled DEMODULATION ELEMENT ASSIGNMENT IN A SYSTEM CAPABLE OF RECEIVING MULTIPLE SIGNALS, (the '165 patent) assigned to the assignee of the present invention.

Figure 2:
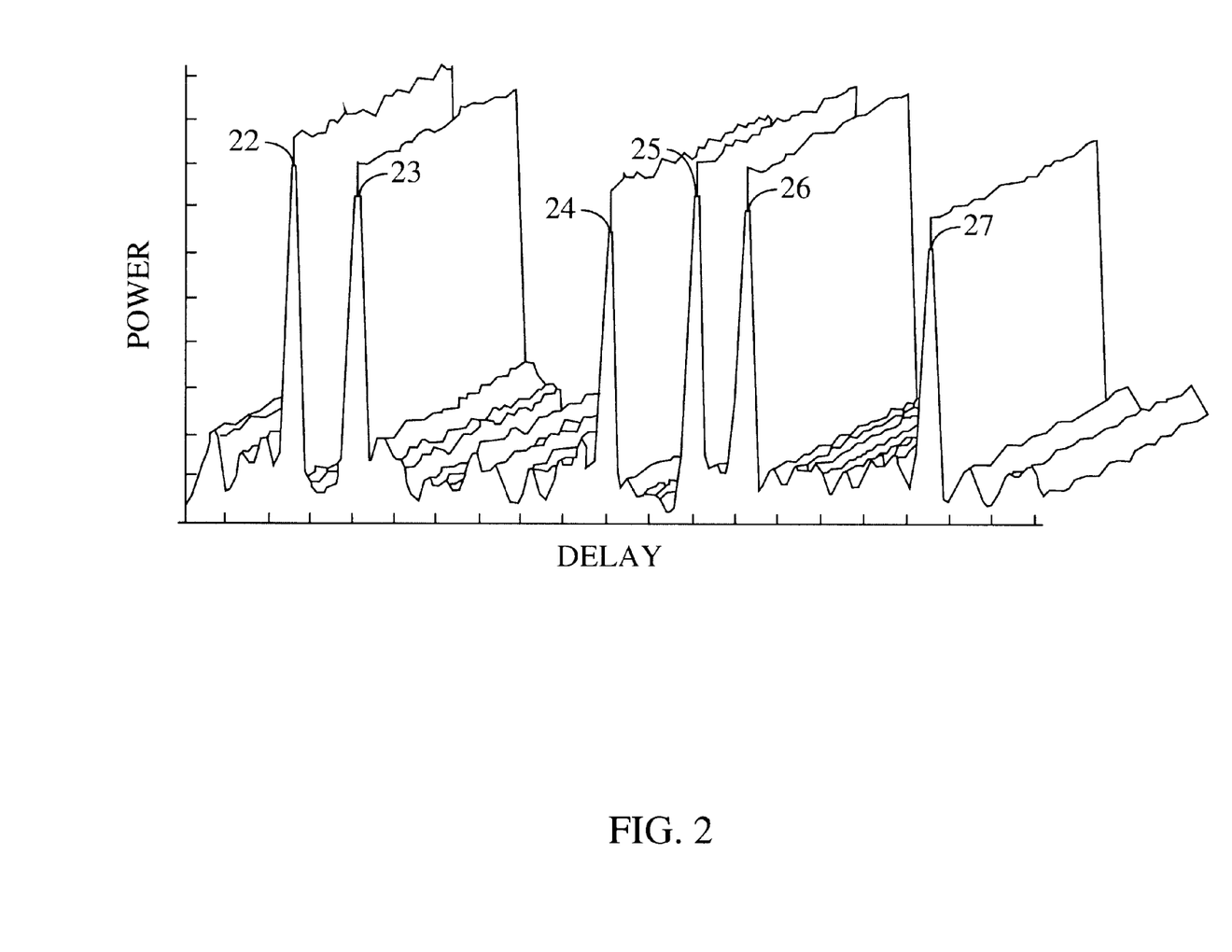
FIG. 2 is a graph showing an exemplifying set of multiple signal instances of a pilot signal from a single base station arriving at a remote unit.

FIG. 2 shows an exemplifying set of multipath signal instances of a single pilot signal from a base station arriving at a remote unit. The vertical axis represents the power received in decibels (dB). The horizontal axis represents the delay in the arrival time of a signal instance due to multipath delays. The axis (not shown) going into the page represents a segment of time. Each signal spike in the common plane of the page has arrived at the remote unit at a common time but has been transmitted by the base station at a different time. Each signal spike 22–27 has traveled a different path and therefore exhibits a different time delay, a different amplitude, and a different phase response. The six different signal spikes represented by spikes 22–27 are representative of a severe multipath environment. A typical urban environment produces fewer usable paths. The noise floor of the system is represented by the peaks and dips having lower energy levels. The task of the search engine is to identify the delay, as measured by the horizontal axis, and amplitude, as measured by the vertical axis, of signal spikes 22–27 for potential demodulation element assignment.

Note, as shown in FIG. 2, each of the multipath peaks varies in amplitude as a function of time as shown by the uneven ridge of each multipath peak. In the limited time shown, there are no major changes in the multipath peaks. Over a more extended time range, multipath peaks disappear and new paths are created as time progresses. Multipath peaks are likely to merge together or blur into a wide peak over time.

Typically, the operation of the search engine is overseen by a controller. The controller commands the search engine to step through a set of offsets, called a search window, that is likely to contain one or more multipath signal peaks suitable for assignment to a demodulation element. For each offset, the search engine reports the energy it found offset back to the controller. Demodulation elements may then be assigned by the controller to the paths identified by the search engine (i.e. the timing reference of their PN generators is aligned with the timing of the identified path). Once a demodulation element has locked onto the signal, it then tracks that path on its own without controller supervision, until the path fades away or until the demodulation element is assigned to another path by the controller.

As noted above, each base station in a given geographical area is assigned a sequence offset of a common PN pilot sequence. For example, according to IS-95, a PN sequence having $2^{15}$ chips (i.e., one bit in the PN sequence) and repeating every 26.66 milliseconds (ms) is transmitted by each base station in the system at one of 512 PN sequence offsets as a pilot signal. According to IS-95 operation, the base stations continually transmit the pilot signal which can be used by the remote unit to identify the base station as well as other functions, such as for example, determining the multipath environment the remote unit is operating in and synchronization of remote unit timing to the base station timing.

During initial power on, or any other situation when the remote unit has lost a pilot signal such as when performing a hard hand-off to a different operating frequency, the remote unit evaluates all possible PN offsets of the pilot PN sequence. Typically, a search engine measures the pilot signal strength at all possible PN offsets, proceeding at a measurement rate that produces an accurate measure of the pilot signal present at the corresponding offset. Proceeding in this manner, the search engine determines the PN offset of base stations which are geographically near the remote unit. Searching each PN offset in this manner can take anywhere from hundreds of milliseconds to a few seconds depending on the channel conditions during acquisition. This amount of time for the remote unit to reacquire a pilot signal is detrimental to the remote unit operation, and may be annoying to the user of the remote unit.

Figure 3:
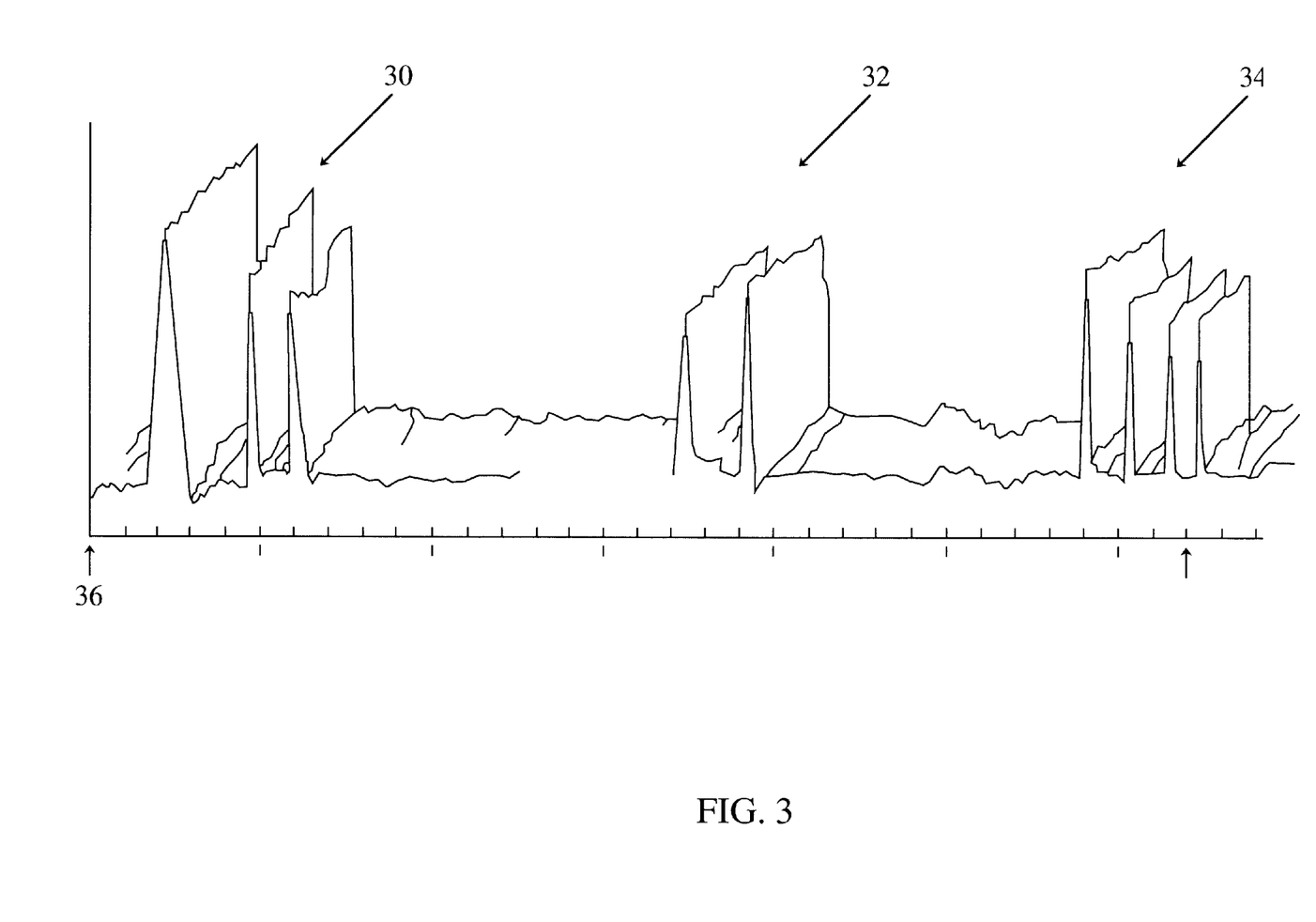
FIG. 3 is a graph showing an exemplifying set of multiple signal instances of pilot signals from multiple base stations arriving at a remote unit.

FIG. 3 shows an extended portion of PN space on the horizontal axis. The groups of peaks 30, 32 and 34 represent transmissions from three different base stations. As shown, the signal from each base station signal experiences a different multipath environment. Also, each base station has a different PN offset from the PN reference 36. Thus, the controller may select a set of PN offsets corresponding to search windows for any of the identified base stations. This allows the remote unit to simultaneously demodulate signals from multiple base stations by assigning demodulation elements appropriately.

In a typical CDMA communication system, remote units sporadically establish bi-directional communications with a base station. For example, a cellular telephone remains idle for significant periods of time when no call is in process.

However, to ensure that any message directed to a remote unit is received, the remote unit continuously monitors the communication channel, even while it is idle. For example, while idle, the remote unit monitors the forward link channel from the base station to detect incoming calls. During such idle periods, the cellular telephone continues to consume power to sustain the elements necessary to monitor for signals from the base stations. Many remote units are portable and are powered by an internal battery. For example, personal communication system (PCS) handsets are almost exclusively battery-powered. The consumption of battery resources by the remote unit in idle mode decreases the battery resources available to the remote unit when a call is placed or received. Therefore, it is desirable to minimize power consumption in a remote unit in the idle state and thereby increase battery life.

One means of reducing remote unit power consumption in a communication system is disclosed in U.S. Pat. No. 5,392,287, entitled APPARATUS AND METHOD FOR REDUCING POWER CONSUMPTION IN A MOBILE COMMUNICATION RECEIVER (the '287 patent), assigned to the assignee of the present invention and hereby incorporated in its entirety herein by reference. In the '287 patent, a technique for reducing power consumption in a remote unit operating in an idle mode (i.e. a remote unit which is not engaged in bi-directional communication with a base station) is disclosed. In idle, each remote unit periodically enters an "active" state during which it prepares to and receives messages on a forward link communication channel. In the time period between successive active states, the remote unit enters an "inactive" state. During the remote unit's inactive state, the base station does not send any messages to that remote unit, although it may send messages to other remote units in the system that are in the active state.

As disclosed in the '287 patent, a base station broadcasts messages which are received by all remote units within the base station coverage area on a "paging channel." All idle remote units within the base station coverage area monitor the paging channel. The paging channel is divided in the time dimension into a continuous stream of "slots." Each remote unit operating in slotted mode monitors only specific slots which have been assigned to it as active (assigned) slots. The paging channel continually transmits messages in numbered slots, repeating the slot sequence, such as for example, every 640 slots. When a remote unit enters the coverage area of a base station, or if a remote unit is initially powered on, it communicates its presence to a preferred base station. Typically the preferred base station is the base station which has the strongest pilot signal as measured by the remote unit.

The preferred base station, along with a plurality of geographically near neighboring base stations, assign a slot, or a plurality of slots, within their respective paging channels, for the remote unit to monitor. The base station uses the slots in the paging channel to transmit control information to a remote unit, if necessary. The remote unit may also monitor a timing signal from the preferred base station allowing the remote unit to align, in the time dimension, to the base station slot timing. By aligning in the time dimension to the preferred base station slot timing, the remote unit can determine when a paging channel slot sequence begins. Thus, knowing when the paging channel slot sequence begins, which slots are assigned for it to monitor, the total number of slots in the repetitive paging channel sequence of slots, and the period of each slot, the remote unit is able to determine when its assigned slots occur.

Generally, the remote unit is in the inactive state while the base station is transmitting on the paging channel in slots which are not within the remote unit's assigned set. While in the inactive state, the remote unit does not monitor timing signals transmitted by the base station, maintaining slot timing using an internal clock source. Additionally, while in the inactive state the remote unit may remove power from selected circuitry, such as, for example, circuits which monitor pilot signals transmitted by base stations to detect changes in the wireless channel including the search engine. Using its internal timing, the remote unit transits to its active state a short period of time before the next occurrence of an assigned slot.

When transiting to the active state, the remote unit applies power to circuitry that monitors the wireless channel, including the search engine. The search engine is used to reacquire the preferred base station's pilot signal and to detect changes in the wireless channel which may have occurred due to the movement of the remote unit or to the movement of objects within the coverage area of the base station. In addition to reacquiring the pilot signal, the remote unit may perform any other actions or initializations in preparation of receiving a message at the beginning of its assigned slot.

When the remote unit enters the active state, it may receive messages in its assigned slots in the paging channel and respond to commands from the base station. For example, the remote unit may be commanded to activate a "traffic" channel to establish a bi-directional communication link for conducting subsequent voice communication in response to an incoming call. If there is no message from the base station, or no command requesting the remote unit to remain active, at the end of the assigned slot the remote unit returns to the inactive state. In addition, the remote unit returns to the inactive state immediately if commanded to do so by the base station.

During its assigned slot, the remote unit's search engine measures the pilot signal strength of the preferred base station as well as the pilot signal strengths of neighboring base stations. If the remote unit relocates from the coverage area of one base station to another neighboring base station's coverage area, the remote unit needs to "hand-off" to the neighboring base station. A hand-off occurs when the transmitted pilot signal strength of a neighbor base station becomes sufficiently stronger than the preferred base station. When this occurs, the neighboring base station is assigned as the preferred base station. Following a hand-off, in the next active state, the remote unit monitors the paging channel of the new preferred base station to receive messages and commands.

In addition to providing data for determining when a hand-off should occur, searches of the preferred base station's pilot signal allow the remote unit to make adjustments to compensate for changes in the multipath environment. For example, if one of the multipath signal instances weakens to the point that it is unusable, the remote unit may reassign demodulation elements accordingly.

Knowing the nominal PN offset of the preferred base station as well as a neighboring set of base stations, typically, the controller passes a set of search parameters to the search engine specifying PN offsets at which multipath signal instances of pilot signals are likely to be found. At the completion of the search, the search engine passes the search results to the controller. The controller analyzes the search results and selects a set of search parameters for the next search. Following selection of the new search parameters, the controller passes the parameters to the search engine and the search process is repeated. This process is repeated until the remote unit once again enters the inactive idle state.

Because searches occur only during the remote unit assigned slot, a limited time period is available for the searches to be performed. Increasing the number of searches performed by a remote unit would improve its ability to determine when a hand-off should occur, as well as providing more information about the multipath environment of the preferred base station, leading to a more robust communication system. However, remaining in the active state for a longer duration consumes more power and reduces the battery life of the remote unit.

Therefore, there is a need in the art for a method and apparatus to increase the efficiency and accuracy of the searching process of the remote unit.

SUMMARY OF THE INVENTION

The invention addresses these and other concerns by providing systems and methods wherein the integration interval of searching is adjusted in response to the pilot signal strength of a preferred base station. Generally, as the preferred base station pilot signal strength increases, the integration interval is decreased. As the preferred base station signal increases, there is less need to integrate the measurement to produce a sufficient signal to noise and for successful estimation of handoff opportunities.

Searches are performed by a remote unit while the remote unit is in an active state. During the active state the remote unit consumes more power than when in its inactive state. To reduce power consumption, and extend battery life, it is desirable for the remote unit to reduce the amount of time it is in its active state which thereby reduces the amount of time available to perform searches. Dynamically adjusting the integration interval in response to the preferred base station signal strength decreases the duration of individual searches while still maintaining adequate signal level for proper operation of the remote unit.

In one aspect of the invention, the remote unit monitors the strength of a signal transmitted by a first base station. In response to the signal strength received by the remote unit the integration interval, used during the search of a second base station, is dynamically adjusted. In general, as the signal strength from the first base station, received by the remote unit, increases the integration interval is decreased in duration. Similarly, as the signal strength form the first base station, received by the remote unit, decreases the integration interval is increased in duration.

In another aspect, the signal transmitted by the first base station is a pilot signal. Additionally the first base station is a preferred base station and the second base station is a plurality of neighboring base stations.

In another aspect, a threshold level is established in the remote unit. When the signal strength received from a first base station by the remote unit is below the threshold level a first integration interval is selected to search a second base station, and if the signal strength received exceeds the threshold level a second, shorter, integration interval is selected.

In a further aspect, a series of thresholds are established and the integration interval adjusted accordingly as the signal strength from a first base station, received by the remote unit, exceeds or drops below any individual threshold.

BRIEF DESCRIPTION OF THE DRAWINGS

The features, objects and advantages of aspects of the present invention will become more apparent from the detailed description set forth below when taken in conjunction with the drawings in which like references characters identify correspondingly throughout, and wherein.

DETAILED DESCRIPTION OF THE INVENTION

Figure 4:
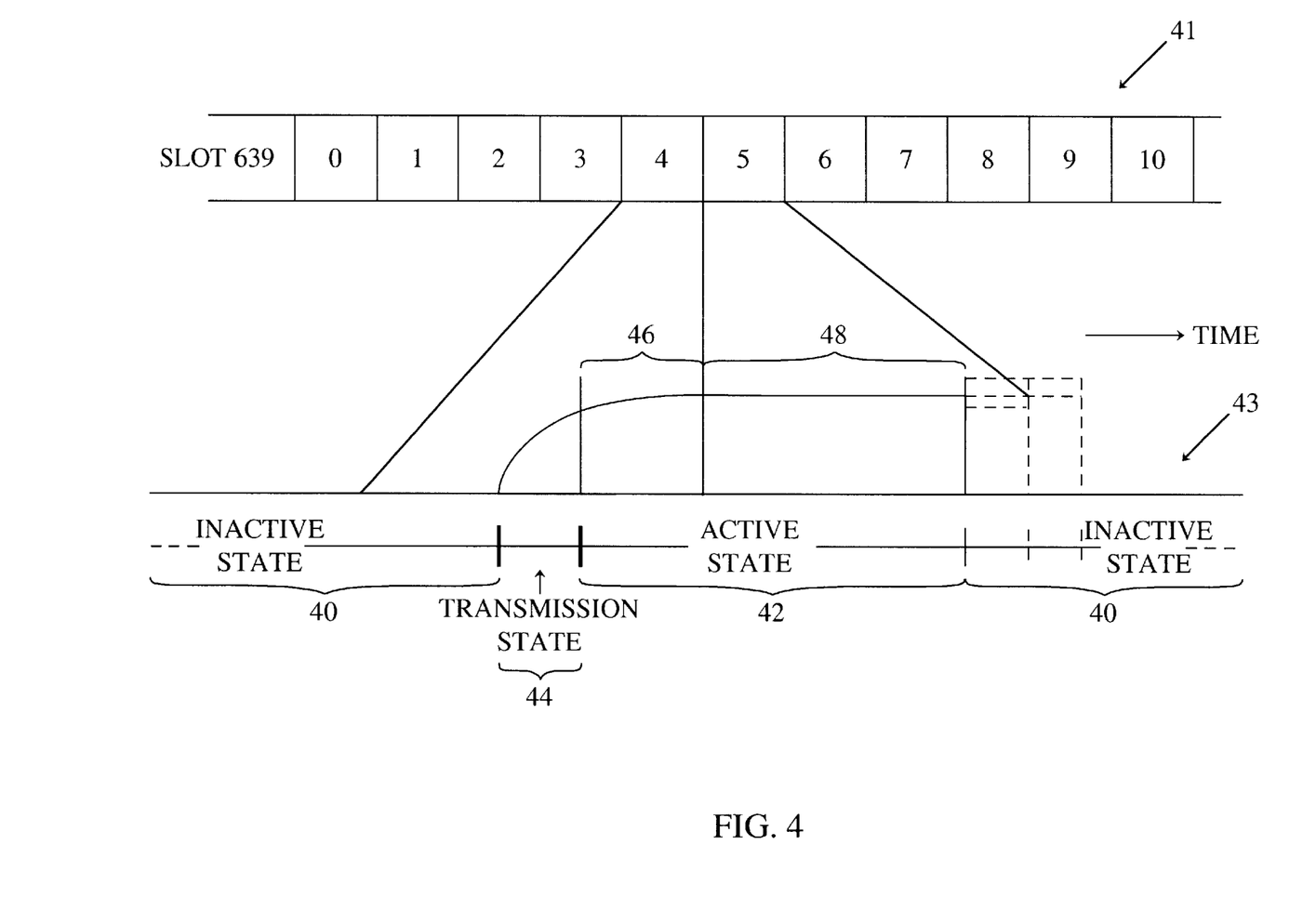
FIG. 4 is a representative diagram illustrating the transition from the inactive state to the active state at the assigned slot of a remote unit in a slotted mode communication system.

FIG. 4 is a representative diagram illustrating the transition from the inactive state to the active state at the assigned slot of a remote unit in a slotted mode communication system. An upper portion 41 represents a continual sequence of slots which flow in time from left to right. The lower portion 43 represents events occurring during a transition between active and inactive states of a remote unit in a slotted mode communication system in which slot 5 is the slot assigned to the remote unit of interest. The time scale for the lower portion has been expanded so that the transition can be shown in more detail.

In particular, the lower portion 43 of FIG. 4 shows the transition from an inactive state 40 to an active state 42. In the active state 42, the remote unit monitors the base station signal during at least a portion of slot 5. Prior to the start of slot 5, the remote unit transits from the inactive state 40 to the active state 42 through a transition state 44. As described above, in the inactive state 40, selected circuitry in the remote unit is unpowered, reducing power consumption and extending battery life of the remote unit. For example, power may be removed from the search engine during the inactive state 40.

During the transition state 44, power is reapplied to the selected circuitry of the remote unit. For example, if the search engine is unpowered, power is reapplied in the transition state 44. The duration of the transition state 44 is sufficient to allow the remote unit to power on circuits and initialize functions so that the remote unit is functional, allowing it to perform searches at the end of the transition state 44.

Following the transition state 44, the remote unit enters the active state 42. The active state 42 is made up of two parts: a preparation period 46 and an assigned slot period 48. During the preparation period 46, an initial search is performed to acquire a signal of the preferred base station. The signal transmitted by the base station and monitored by the remote unit may be, for example, a pilot signal or a synchronization signal. After acquiring the signal transmitted by the base station, the remote unit is prepared to monitor the paging channel during the assigned slot period 48. The assigned slot period 48 begins at the beginning of slot 5.

During the assigned slot period 48, the remote unit receives messages on the paging channel from the preferred base station. Nominally, at the completion of slot 5, the assigned slot period 48 and the active state 42 terminate and the remote unit enters the inactive state 40. In order to further reduce the power consumption of the remote unit, the base station may command the remote unit to enter the inactive state 40 before the completion of slot 5. Alternatively, if the base station cannot complete the transfer of messages during slot 5, the base station may command the remote unit to remain in the assigned slot period 48 after the completion of the slot. 5.

Subsequently, the base station commands the remote unit to enter the inactive state 40. Searching terminates upon entering the inactive state 40 and power can then be removed from the search engine.

Figure 5:
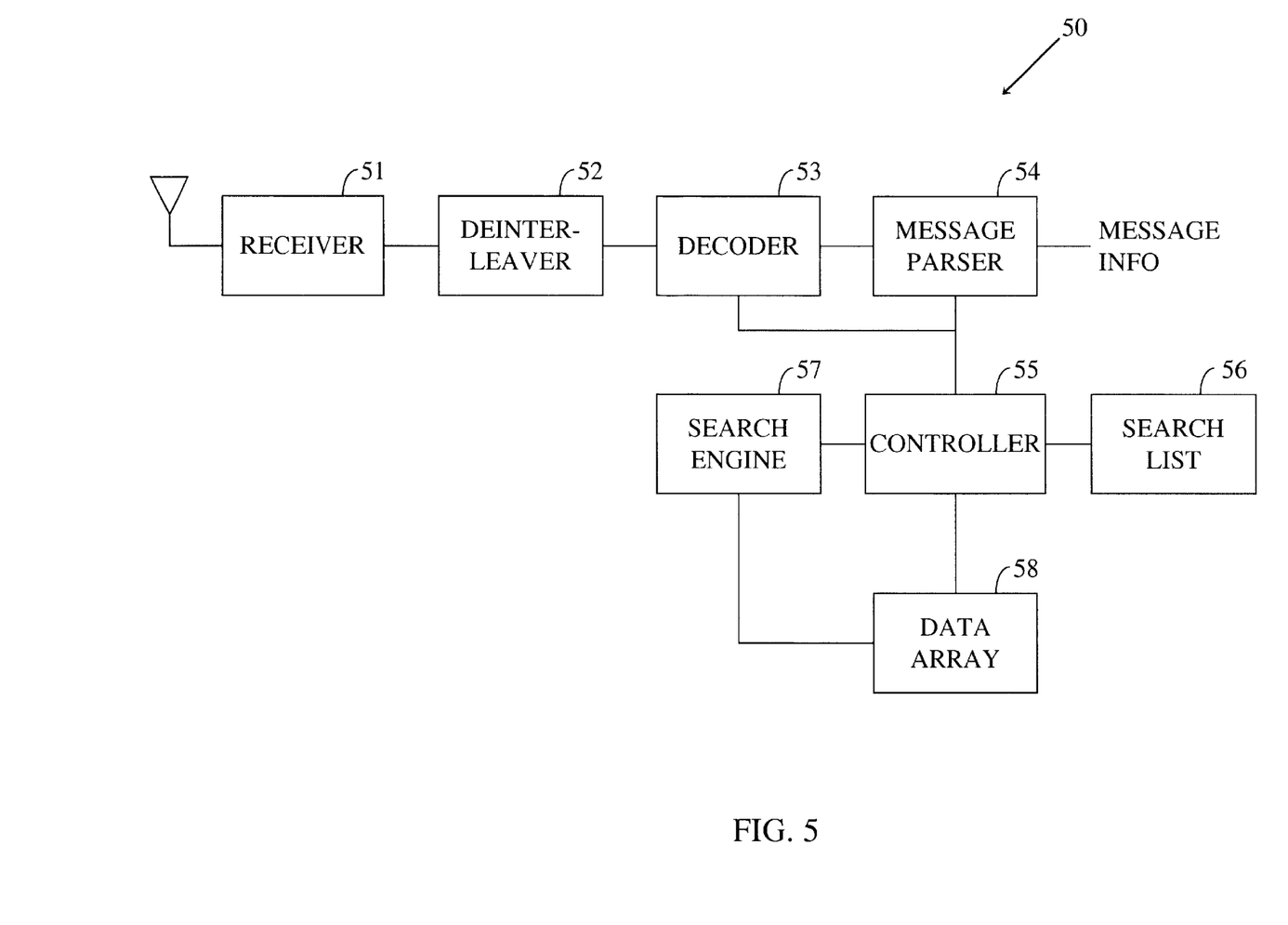
FIG. 5 is a block diagram of an embodiment of a remote unit.

FIG. 5 is a functional block diagram showing selected portions of a remote unit 50. A receiver 51 receives wireless link signals. The receiver 51 provides for reception and down-conversion of the wireless link signal and also provides despreading in a CDMA environment, as well as other demodulation functions. The receiver 51 provides a series of digital values at its output.

According to well-known wireless link protocols, such as IS-95, before data is transmitted over the wireless link, it is divided into a series of blocks. The blocks are reordered in time such that the block order is non-time sequential as transmitted over the wireless link. This method of transmitting blocks is referred to as interleaving, and the process of reordering the blocks is referred to as deinterleaving. A deinterleaver 52 performs the deinterleaving function. The deinterleaver 52 receives samples from the receiver 51 and accumulates a series of blocks data. When an entire set of blocks has been received, the deinterleaver 52 reorders the blocks in time-sequential order and outputs them to a decoder 53.

In one embodiment, the decoder 53 is a convolutional decoder. One common form of convolutional decoders is the Virterbi decoder. A Virterbi decoder creates soft decision data based upon groups of data. When the decoder buffer contains sufficient data, the data is passed to a message parser 54. The message parser 54 performs such functions as collection of bits in the message, computing and verifying any cyclic redundancy code (CRC) or other error checking code, translation of the message into an internal format, copying the transformed message into a buffer, and placement of the transformed message onto a queue for the proper protocol task. The message is evaluated field-by-field. In general, the processes of the decoder 53 and the message parser 54 are controlled by a controller 55.

The controller 55 is also in communication with a search list 56 stored in memory, such as for example, a RAM or a portion of an Application Specific Integrated Circuit (ASIC) or other suitable electronic storage. In addition, the controller 55 is in communication with a search engine 57 so as to pass search parameters to the search engine 57. The search engine 57 is in communication with a data array 58 so as to store search results in the data array 58. The controller 55 is also in communication with the data array 58, thereby providing the controller 55 access to the search results stored therein. In one embodiment, the controller 55 is a microprocessor. The controller 55 may be an ASIC, a Field Programmable Gate Array (FPGA), discrete logic, analog circuitry, or other control circuitry. Both the controller 55 and search engine 57 can be fabricated on the same ASIC. Additionally, the search list 56 and data array 58 can be included on the same or a different ASIC. The configuration of the hardware in the remote unit 50 may be controlled through firmware, allowing field upgrade of a remote unit by downloading new firmware.

In general, operation of the remote unit 50 is controlled by configuration of the hardware and software executed on the controller 55. The hardware configuration may be established by firmware, software, hardwiring of discrete devices or any combination of the above.

When the remote unit 50 is initially powered on, no entries are in the search list 56. The remote unit 50 can perform searches in accordance with the technique disclosed in the above-referenced U.S. patent application Ser. No. 09,540,128 entitled FAST ACQUISITION OF A PILOT SIGNAL IN A WIRELESS COMMUNICATION DEVICE; Qualcomm Reference No. PD990253), or other well known techniques, to evaluate pilot signal strength. At the completion of searching, the search results are stored in the data array 58.

After the remote unit 50 has reacquired the preferred base station signal according to well-know techniques, the base station transmits nominal PN offsets for neighboring base stations to the remote unit 50 according to IS-95. The remote unit 50, using these offsets, searches for pilot signals of the neighboring base stations and measures the strength of their pilot signals. The controller 55 builds the search list 56 comprising the neighboring base station identification, measured pilot signal strength and measurement time. During subsequent searching by the remote unit 50, entries in the search list 56 are updated. Thus, the search list 56 contains the most recent measured pilot signal strengths of neighboring base stations and an indication of when the measurement was made.

In one embodiment, the remote unit 50 begins general searching for pilot signals from neighboring base stations only after entering the assigned slot period 48 depicted in FIG. 4. Alternatively, general searching for pilot signals from neighboring base stations begins while the remote unit is still in the preparation period 46, immediately following reacquisition and alignment with the preferred base station. During general searching, the remote unit can continue to measure the pilot signal strength of the preferred base station.

Figure 6:
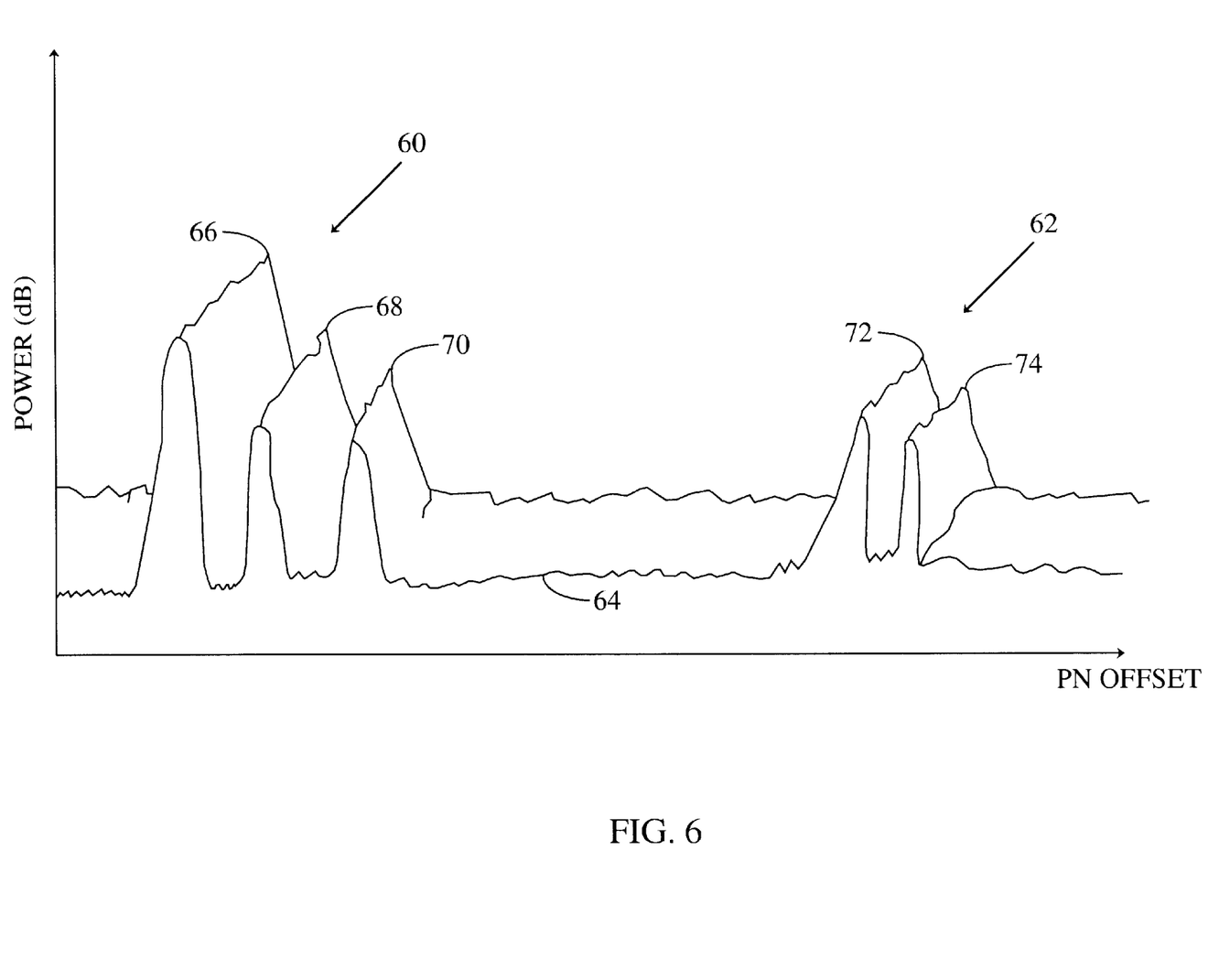
FIG. 6 is a graph showing an exemplifying set of multiple signal instances of pilot signals from two base stations received using a typical integration interval.

FIG. 6 shows an extended portion of PN space. The horizontal axis represents PN offset in PN chips. The vertical axis represents received power in dB. The groups of peaks 60 and 62 represent transmissions from two different base stations. As is shown, the signal from each base station experiences a different multipath environment indicated by variations in signed amplitude and the number of multipath instances.

Each base station transmits the pilot signal at a different PN offset from the other neighboring base stations. Thus, in the remote unit 50 the controller 52 generally commands the search engine 56 to seek multipath signal instances based upon the nominal PN offset of multiple surrounding base stations. By identifying signal instances from multiple base stations, the remote unit 50 is able to simultaneously demodulate signals from multiple base stations by assigning demodulation elements appropriately.

FIG. 6 is illustrative of multipath signals measured with a typical integration interval. The integration interval corresponds to how long, i.e. how many chips, the search engine remains at a PN offset measuring the signal strength present. In general, the longer the integration interval the better the accuracy of the signal measurement. One reason for the improvement in the accuracy of the measurement is that short term variations in the received signal strength, such as, for example, a fade, will be averaged with "unfaded" signal measurements giving a more accurate measurement of the average signal strength present at the PN offset. Another reason for improvement in the measurement is that in general the longer the integration interval, the more likely peaks in the noise floor will average out. Noise, typically being random and gaussian in nature, will average toward a lower overall level than peak instantaneous values. The lower overall noise floor 64 corresponds to improvement in the signal to noise ratio of the measurement.

As illustrated in FIG. 6, multipath instances 66, 68 and 70 in group 60, and multipath instances 72 and 74 in group 62, are significantly stronger than the noise floor 64. The relatively high signal strength in comparison to the noise floor leads to a high signal to noise ratio improving the ability of the remote unit 50 to identify and measure multipath instances of base stations.

Figure 7:
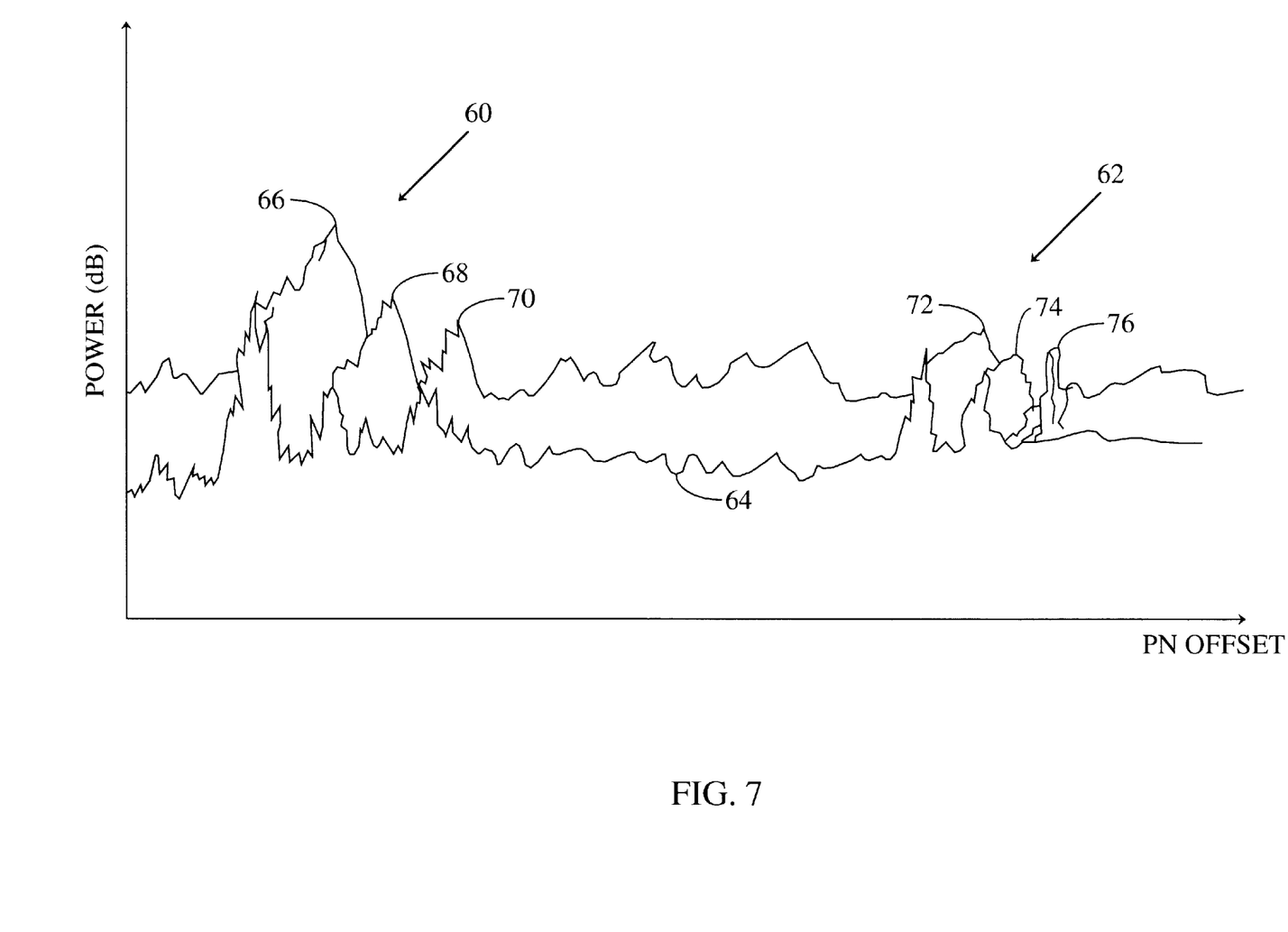
FIG. 7 is a graph showing an exemplifying set of multiple signal instances of pilot signals from two base stations received using a shortened integration interval.

FIG. 7 illustrates an example of the same multipath signals shown in FIG. 6 measured with a shorter integration interval. The shorter integration interval results in less accuracy in the measurement of the signal strength. As shown in FIG. 7, there is more variation in the multipath instances 66, 68 and 70 of group 60, and 72 and 74 of group 62, than the measurement with a longer integration interval illustrated in FIG. 6. The larger variations in the signal result from a reduction in signal averaging because of the reduction in integration interval. As illustrated in FIG. 7, a decrease in integration interval makes measurements of multipath signal strengths more susceptible to instantaneous variations in the signal due to, for example fading.

Also illustrated in FIG. 7 is an increase in the measurement peaks in the noise floor 64 over that illustrated in FIG. 6. The peaks in the noise floor 64 increase due to less averaging because of the decreased integration interval. The larger variations in the multipath signal measurement, which may result in a lower measured signal level, and the increased peaks in the noise floor result in a lower signal to noise ratio of the measurement. This decreased signal to noise ratio adversely affects the operation of the remote unit by decreasing the remote unit's ability to identify and measure multipath instances.

As illustrated in FIG. 7, the decreased integration interval may also result in an instantaneous noise spike 76 being large enough to be confused with the multipath instances of a base station. If a longer integration interval, such as illustrated in FIG. 6, were used the energy in noise spike 76 would be combined with the other measurements at the corresponding PN offset, resulting in a lower average level than the instantaneous level. Thus, as the integration interval decreases it will become more likely that the remote unit may misidentify multipath instances of a pilot signal or miss the multipath instances of some lower signal strength base stations altogether.

However, if the preferred base station pilot signal is sufficiently strong, the ability to identify lower level multiple instances of the pilot signal is not critical to the operation of the system. With a preferred base station signal sufficiently strong, it is not necessary for the remote unit to aggregate as many multipath signal instances to obtain a signal level adequate to successfully receive messages.

In addition, typically before the remote unit performs a handoff to a neighboring base station, the neighboring base station signal is generally stronger than the preferred base station. Therefore, even if the remote unit uses a decreased integration interval, such that weaker neighboring base station pilot signals are not adequately detected, the remote unit will still be able to detect a neighboring base station pilot signal which is as strong, or stronger, than the preferred base station. Thus, as the pilot signal strength of the preferred base station increases, the remote unit can reduce the integration interval correspondingly. The integration level will be maintained at a high enough duration to ensure adequate signal levels to successfully receive messages. The decrease in integration interval decreases the duration of an individual search, allowing the remote unit to perform more searches in a given period of time.

The remote unit, based upon the amplitude of the pilot signal received from the preferred base station, can dynamically adjust the integration interval used for searching for the signals of neighboring base stations.

In one embodiment, a remote unit has three integration intervals. If the strength of the preferred base station pilot signal received by the remote unit is less than a first threshold level, a first integration interval, for example, 512 chips, is selected. If the strength of the preferred base station exceeds a second threshold level, a second integration interval, for example, 256 chips, is selected.

If the strength of the preferred base station pilot signal received by the remote unit is between the first and second thresholds, a third integration interval, for example, 360 chips, is selected. The first threshold may be when the preferred base station pilot signal energy received by the remote unit is −10 dB, and the second threshold may be −6 dB relative to the total energy received by the remote unit.

In another embodiment there are a series of thresholds and corresponding integration intervals. As the signal strength of the pilot signal of the preferred base station increases above a series of thresholds, a correspondingly shorter duration integration interval is selected. As the pilot signal strength decreases, dropping below a series of thresholds, a correspondingly longer integration interval is selected. If the pilot signal drops below a minimum threshold a default integration interval is selected. For example, the lowest threshold may be −10 dB relative to the total energy received by the remote unit corresponding to an integration interval of 512 chips. For every 3 dB increase in the preferred base station pilot signal, the integration interval is corresponding decreased by the ratio of $1/\sqrt{2}$.

In yet another embodiment the integration interval is continuously adjusted as the pilot signal strength of the preferred base station varies. As the pilot signal of the preferred base station increases, exceeding a maximum threshold, a correspondingly minimum duration integration interval is selected. If the pilot signal drops below a minimum threshold a default maximum duration integration interval is selected. Between these two thresholds the integration interval is adjusted by an amount inversely proportional to the pilot signal strength of the preferred base station.

Figure 8:
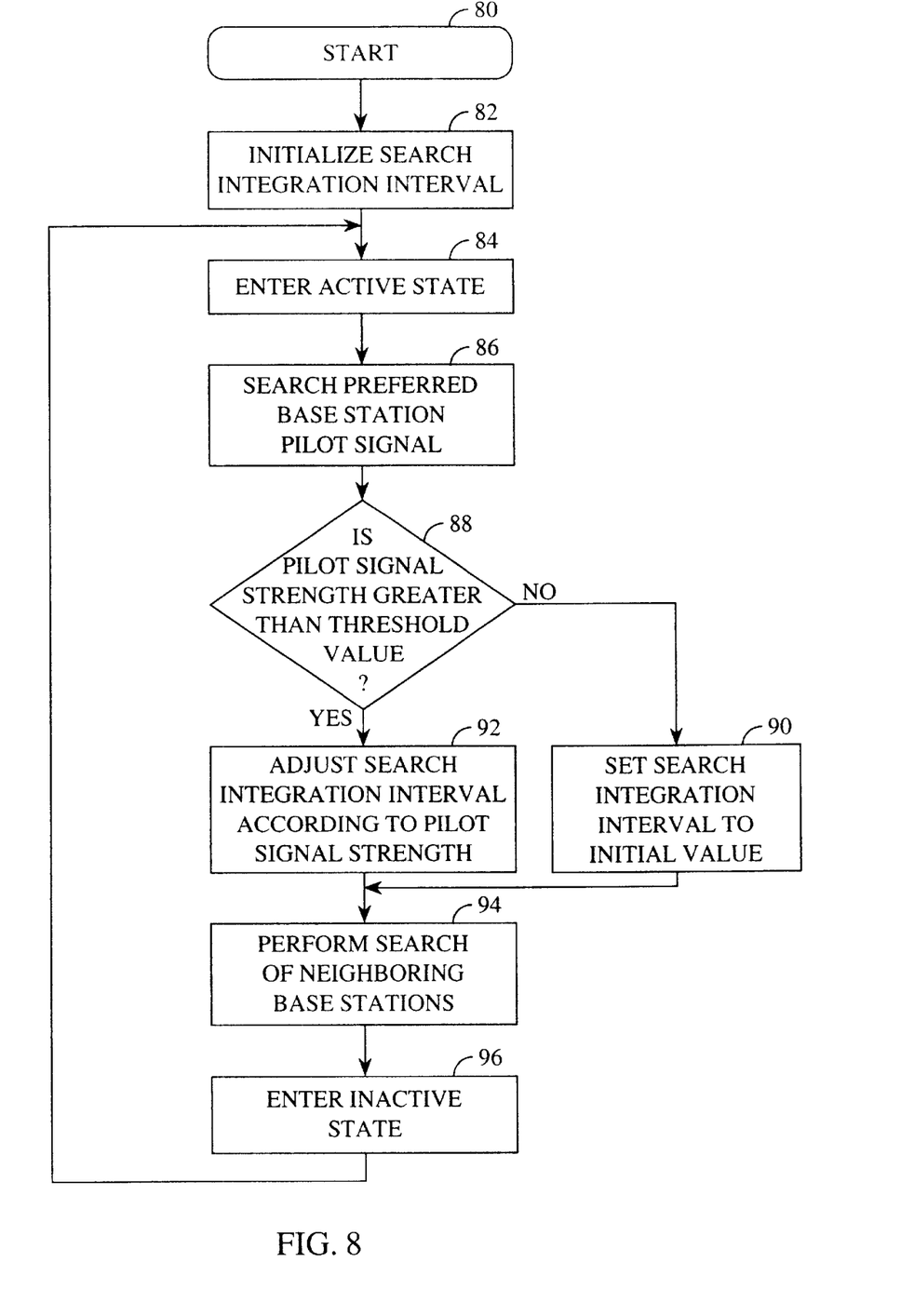
FIG. 8 is a flow chart of a method for sizing of the neighboring base station search window.

FIG. 8 is a flowchart illustrating a method or process which adjusts the integration interval for searching neighboring base stations in relation to the preferred base station pilot signal level. The method or process illustrated in FIG. 8 can be implemented in hardware, as depicted in FIG. 5, operating control of software or firmware. Flow begins in block 80. In block 82, an integration interval duration is initialized. Flow then continues to block 84 where the remote unit enters its active state. During the transition between its inactive and active states, the remote unit applies power to selected circuitry that had power removed such as, for example, the search engine. Flow continues to block 86 where the remote unit performs a search reacquiring and measuring the signal strength of the pilot signal of the preferred base station. In addition, the remote unit receives nominal PN offsets of neighboring base stations from the preferred base station. Flow then continues to block 88.

In block 88, the preferred base station pilot signal level is examined to determine if it exceeds a threshold. If the pilot signal level does not exceed a threshold either because it has never exceeded it or had decreased to less than the level, flow continues to block 90. In block 90, the integration interval is set to the initial value. Flow then continues to block 94. Referring again to block 88, if the pilot signal strength of the preferred base station exceeds a threshold level, flow continues to block 92 where the integration interval is adjusted in relation to the preferred base station pilot signal strength. As discussed above, the integration interval can be selected from one of two durations depending if the pilot signal strength exceeds the threshold. Additionally, the integration interval can be selected from a set of integration intervals that decrease and increase in duration as the pilot signal strength increases and decreases, respectively. Further, the integration interval can be continually adjusted in relation to the pilot signal strength. After adjustment of the integration interval, flow continues to block 94.

In block 94, searches are performed on neighboring base stations utilizing an integration interval determined in either block 90 or 92. Searching continues in block 94 until the remote unit is either commanded to reenter the inactive state by the preferred base station, or the end of the assigned slot occurs. Flow then continues to block 96 where the remote unit enters an inactive state. The remote unit remains in the inactive state until the next active state occurs at which time flow continues to block 84.

Although the embodiments discussed above describe aspects of the invention as used relative to a pilot signal of a preferred base station in a wireless communication system, it would be readily apparent to one of ordinary skill in the art that the techniques disclosed also be applicable to other signals transmitted by a base station, such as a synchronization signal, or any system which monitors multiple sources. For example, the remote unit may decode a signal transmitted by a base station and evaluate the number of bit errors. The number of errors, bit error rate, is an indication of the quality of the signal received by the remote unit, and therefore the integration interval can be adjusted accordingly. For example, the integration interval can be increased in response to a high bit error rate. Furthermore, the techniques can be used with data signals or internet traffic transmitted from multiple sources, such as, for example, low orbiting satellites.

More information concerning the searching process, demodulating element assignment and search engines can be found in:

(1) U.S. Pat. No. 5,644,591, entitled METHOD AND APPARATUS FOR PERFORMING SEARCH ACQUISITION IN A CDMA COMMUNICATIONS SYSTEM;

(2) U.S. Pat. No. 5,805,648, entitled METHOD AND APPARATUS FOR PERFORMING SEARCH ACQUISITION IN A CDMA COMMUNICATIONS SYSTEM;

(3) U.S. Pat. Nos. 5,867,527 and 5,710,768, entitled METHOD OF SEARCHING FOR A BURSTY SIGNAL;

(4) U.S. Pat. No. 5,764,687, entitled MOBILE DEMODULATOR ARCHITECTURE FOR A SPREAD SPECTRUM MULTIPLE ACCESS COMMUNICATION SYSTEM;

(5) U.S. Pat. No. 5,577,022, entitled PILOT SIGNAL SEARCHING TECHNIQUE FOR A CELLULAR COMMUNICATIONS SYSTEM;

(6) U.S. Pat. No. 5,654,979, entitled CELL SITE DEMODULATION ARCHITECTURE FOR A SPREAD SPECTRUM MULTIPLE ACCESS COMMUNICATION SYSTEMS;

(7) application Ser. No. 08/987,172, entitled MULTI CHANNEL DEMODULATOR, filed on Dec. 9, 1997; and (8) application Ser. No. 09/283,010, entitled PROGRAMMABLE MATCHED FILTER SEARCHER, filed on Mar. 31, 1999;

each of which is assigned to the assignee hereof and incorporated herein by reference, in its entirety.

The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of determining an integration interval used by a remote unit for use in a wireless communication system comprising:

measuring the strength of a signal, received by a remote unit, that was transmitted by a first base station;

selecting an integration interval in response to said signal strength; and using said selected integration interval when monitoring a signal transmitted by at least one other base station.

2. The method of claim 1 wherein said first base station is a preferred base station.

3. The method of claim 1 wherein said selected integration interval is used when monitoring a plurality of other base stations.

4. The method of claim 1 wherein said signal from the first base station is a pilot signal.

5. The method of claim 1 wherein said signal from said at least one other base station is a pilot signal.

6. The method of claim 1 wherein said signal from the first base station is a synchronization signal.

7. The method of claim 1 wherein said signal from said at least one other base station is a synchronization signal.

8. The remote unit of claim 1 wherein said controller is further configured such that there are a plurality of thresholds and said integration interval is changed each time said determined signal strength crosses one of said threshold levels.

9. The method of claim 1 wherein said selected base station is a preferred base station.

10. The method of claim 1 wherein said at least one non selected base station comprises a plurality of neighboring base stations.

11. The method of claim 1 wherein said signal from the selected base station is a pilot signal.

12. The method of claim 1 wherein said signals from said at least one non selected base stations are pilot signals.

13. The method of claim 1 wherein said signal from the selected base station is a synchronization signal.

14. The method of claim 1 wherein said signals from said at least one non selected base stations are synchronization signals.

15. The method of claim 1 wherein if said signal strength is below a threshold level a first integration interval is selected, and if said signal strength is equal to or exceeds said threshold level, a second integration interval is selected.

16. The method of claim 1 wherein there are a plurality of thresholds and said integration interval is changed each time said signal strength crosses a threshold.

17. The method of claim 1 wherein said coded signal is a synchronization signal.

18. The method of claim 1 wherein said first base station is a preferred base station.

19. The remote unit of claim 1 wherein said controller is further configured such that said integration interval is selected in response to said determined signal strength.

20. The remote unit of claim 1 wherein said controller is further configured such that if said determined signal strength is below a threshold level a first integration interval is selected, and if said determined signal strength is equal to or exceeds said threshold level a second integration interval is selected.

21. The method of claim 1 wherein said at least one other base station is a plurality of neighboring base stations.

22. A method of determining an integration interval used by a remote unit in a wireless communication system with a plurality of base stations, each base station configured to transmit a PN encoded signal at a time offset different that neighboring base stations, and at least one remote unit configured to receive said PN encoded signals transmitted by base stations, the method comprising:

measuring a signal strength of a signal transmitted by a selected base station and received by a remote unit;

selecting an integration interval in response to said signal strength; and using said selected integration interval when monitoring signals transmitted by at least one non selected base station.

23. A remote unit for use in a wireless communication system comprising:

means for measuring a signal strength of a signal transmitted by a base station and received by a remote unit;

means for selecting an integration interval in response to said signal strength; and means for monitoring a signal transmitted by at least one non selected base station using said selected integration interval.

24. A remote unit for use in a wireless communication system comprising:

a search engine configured to determine a signal strength of a received signals and perform searches for signal transmitted by base stations; and a controller in communication with said search engine configured to:
pass selected search parameters to the search engine,
receive search results,
evaluate said determined signal strength of said received signal,
select an integration interval used to search for signals transmitted by base stations.

25. A method of determining an integration interval used by a remote unit for use in a wireless communication system comprising:

receiving a coded signal by a remote unit that was transmitted by a first base station;

decoding said coded signal;

determining a number of bit errors in said coded signal;

selecting an integration interval in response to said number of bit errors; and using said integration interval when monitoring a signal transmitted by at least one other base station.

* * * * *